(12) United States Patent
Gombert et al.

(10) Patent No.: US 8,160,992 B2
(45) Date of Patent: *Apr. 17, 2012

(54) SYSTEM AND METHOD FOR SELECTING A PACKAGE STRUCTURAL DESIGN

(75) Inventors: Barry Glynn Gombert, Rochester, NY (US); John Oliver Walker, Rochester, NY (US); Philip Crane Rose, Sodus, NY (US); Jennifer Colleen Perotti, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/121,179

(22) Filed: May 15, 2008

(65) Prior Publication Data

US 2009/0287632 A1 Nov. 19, 2009

(51) Int. Cl.
*G06F 17/00* (2006.01)

(52) U.S. Cl. ............. 706/55; 53/458; 707/601; 707/804

(58) Field of Classification Search ................ 706/55; 53/458; 707/804, 601
See application file for complete search history.

(56) References Cited

U.S. PATENT DOCUMENTS

| | | | |
|---|---|---|---|
| 3,902,655 A | 9/1975 | Huffman | |
| 5,235,519 A | 8/1993 | Miura | |
| 5,291,583 A | 3/1994 | Bapat | |
| 5,457,904 A | 10/1995 | Colvin | |
| 5,513,117 A | 4/1996 | Small | |
| 5,518,574 A | 5/1996 | Yates et al. | |
| 5,528,517 A | 6/1996 | Loken | |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |
| 5,923,556 A | 7/1999 | Harris | |
| 6,005,959 A * | 12/1999 | Mohan et al. | 382/110 |
| 6,090,027 A | 7/2000 | Brinkman | |
| 6,092,054 A | 7/2000 | Tackbary et al. | |
| 6,117,061 A | 9/2000 | Popat et al. | |

(Continued)

FOREIGN PATENT DOCUMENTS

WO 2005000681 A2 1/2005

(Continued)

OTHER PUBLICATIONS

Liang Lu et al, "Folding Cartons with Fixtures: A Motion Planning Approach", IEEE Transactions on Robotics and Automation, vol. 16, No. 4, Aug. 2000.

*Primary Examiner* — Jeffrey A Gaffin
*Assistant Examiner* — David H Kim
(74) *Attorney, Agent, or Firm* — Pepper Hamilton LLP

(57) ABSTRACT

A system and method of selecting a package model may include maintaining a data structure of a plurality of package models. Each package model may have a plurality of package model attributes including at least a size and a style. A user input may be received that is descriptive of a desired package capability. The user input may be analyzed using a semantic reasoner to determine one or more desired attributes. One or more package models may be automatically selected by accessing the data structure wherein, for each selected package model, each desired attribute satisfies the corresponding package model attribute. The one or more selected package models may be presented.

19 Claims, 5 Drawing Sheets

U.S. PATENT DOCUMENTS

| | | |
|---|---|---|
| 6,134,018 A | 10/2000 | Dziesietnik et al. |
| 6,153,039 A | 11/2000 | Jacobsen |
| 6,237,787 B1 | 5/2001 | Gallo et al. |
| 6,243,172 B1 | 6/2001 | Gauthier et al. |
| 6,246,468 B1 | 6/2001 | Dimsdale |
| 6,332,149 B1 | 12/2001 | Warmus et al. |
| 6,409,019 B1 | 6/2002 | Hornsby et al. |
| 6,687,016 B2 | 2/2004 | Gauthier |
| 6,689,035 B1 | 2/2004 | Gerber |
| 6,771,387 B2 | 8/2004 | Gauthier |
| 6,895,549 B1 | 5/2005 | Albright et al. |
| 6,896,250 B2 | 5/2005 | Hillebrand |
| 6,939,063 B2 | 9/2005 | Bussell |
| 6,948,115 B2 | 9/2005 | Aizikowitz et al. |
| 6,953,513 B1 | 10/2005 | Volkert |
| 7,013,616 B1 | 3/2006 | Powers et al. |
| 7,197,465 B1 | 3/2007 | Hu et al. |
| 7,243,303 B2 | 7/2007 | Purvis et al. |
| 7,293,652 B2 | 11/2007 | Learn et al. |
| 7,327,362 B2 | 2/2008 | Grau |
| 7,406,194 B2 | 7/2008 | Aizikowitz et al. |
| 7,647,752 B2 | 1/2010 | Magnell |
| 7,832,560 B2 | 11/2010 | Tilton |
| 8,028,501 B2 * | 10/2011 | Buckley et al. ............ 53/456 |
| 2002/0085001 A1 | 7/2002 | Taylor |
| 2002/0118874 A1 | 8/2002 | Chung et al. |
| 2003/0035138 A1 | 2/2003 | Schilling |
| 2003/0083763 A1 | 5/2003 | Kiyohara et al. |
| 2003/0091227 A1 | 5/2003 | Chang et al. |
| 2003/0164875 A1 | 9/2003 | Myers |
| 2003/0200111 A1 * | 10/2003 | Damji ............................ 705/1 |
| 2004/0073407 A1 | 4/2004 | Nguyen et al. |
| 2004/0120603 A1 | 6/2004 | Gupta |
| 2005/0005261 A1 | 1/2005 | Severin |
| 2005/0050052 A1 | 3/2005 | Zimmerman et al. |
| 2005/0249400 A1 | 11/2005 | Fukumoto |
| 2006/0080274 A1 | 4/2006 | Mourad |
| 2006/0155561 A1 | 7/2006 | Harper |
| 2006/0217831 A1 | 9/2006 | Butterworth et al. |
| 2006/0284360 A1 | 12/2006 | Hume et al. |
| 2007/0041035 A1 | 2/2007 | Sembower et al. |
| 2007/0042885 A1 | 2/2007 | Rietjens et al. |
| 2007/0112460 A1 | 5/2007 | Kiselik |
| 2007/0172986 A1 | 7/2007 | Huang et al. |
| 2008/0048308 A1 | 2/2008 | Lam |
| 2008/0077415 A1 * | 3/2008 | Shannon et al. ................ 705/1 |
| 2008/0129035 A1 * | 6/2008 | McDonald et al. ............ 283/67 |
| 2008/0255945 A1 | 10/2008 | Percival et al. |
| 2009/0063381 A1 | 3/2009 | Chan et al. |
| 2009/0070213 A1 | 3/2009 | Miller et al. |
| 2009/0236752 A1 | 9/2009 | Lee et al. |
| 2009/0282782 A1 | 11/2009 | Walker et al. |
| 2009/0287632 A1 | 11/2009 | Gombert et al. |
| 2009/0287717 A1 | 11/2009 | Gombert et al. |
| 2010/0060909 A1 | 3/2010 | Conescu et al. |
| 2010/0098319 A1 | 4/2010 | Gombert et al. |
| 2010/0110479 A1 | 5/2010 | Gombert et al. |

FOREIGN PATENT DOCUMENTS

| | | |
|---|---|---|
| WO | 2005054983 A2 | 6/2005 |
| WO | 2005122079 A2 | 12/2005 |
| WO | WO 2007021920 A2 | 2/2007 |

* cited by examiner

| | | |
|---|---|---|
| 401 — | style (x,y) | x has the style y |
| 402 — | weight (x,y) | y is the weight the base of x can hold securely |
| 403 — | aperture (x,y) | x has the style y of aperture |
| 404 — | base (x,y) | x has the style y of base |
| 405 — | acceptable (x) | package x satisfies the requirements |

*FIG. 4*

501 — r1 :=> acceptable(X)
502 — r2 : style (X,Y), Y= Carton => acceptable(X)
503 — r3 : aperture (X,Y), Y= Interlock Flap Tuck End => acceptable(X)
504 — r4 : base(X,Y), Y= Interlock Flap Tuck End => acceptable(X)
505 — r5 : weight(X,Y), Y > 3 => acceptable(X)

Precedence:
  r2 > r1
  r3 > r2
  r4 > r3
  r5 > r4

*FIG. 5*

| ID | CAD | STYLE | APERTURE | BASE | WEIGHT (lbs.) |
|---|---|---|---|---|---|
| D1 | | SLEEVE | OPEN | OPEN | 0 |
| D2 | | BIN | OPEN | SNAP LOCK BASE | 5 |
| D3 | | BIN | OPEN | INTERLOCK FLAP TUCK END | 2 |
| D4 | | CARTON | SIDE LOCK SKILLET | SIDE LOCK SKILLET | 3 |
| D5 | | CARTON | SKILLET | SKILLET | 5 |
| D6 | | CARTON | INTERLOCK FLAP TUCK END | CRASH LOCK BASE | 2 |

*FIG. 6*

SYSTEM AND METHOD FOR SELECTING A PACKAGE STRUCTURAL DESIGN

BACKGROUND

The disclosed embodiments relate generally to methods and systems for selecting a package.

Designing a new package is a time-consuming process requiring in-depth knowledge of packaging material structural properties and structural design software (i.e., computer aided design software). Groups, such as the European Carton Manufacturing Association (ECMA), the European Federation of Corrugated Board Manufacturers (FEFCO), the European Solid Board Organization (ASSCO) and the Paperboard Packaging Council (PPC), have developed standards and guidelines to assist designers and manufacturers in defining structural models. The ECMA created the Code of Folding Carton Styles. The Code of Folding Carton Styles provides a reference model standard for paper cartons. FEFCO and the ASSCO created an international shipping package code (the FEFCO Code) which defines international designs, styles and delivery forms of cartons made from cardboard, millboard and corrugated board. Additionally, the PPC offers a handbook entitled "Ideas and Innovation" that outlines various paperboard packaging styles and provides design details for graphic and structural designers and planners.

While current software incorporates these and other standards, the process can be costly because creating a structural model requires an individual with sufficient domain knowledge to select and complete a design. For example, an individual must have sufficient knowledge in order to select a design that best suits a customer's particular needs, design components that are needed for a particular package model, determine types of material or substrates that should be used for a particular package model, and determine how components of a package model interrelate.

SUMMARY

In an embodiment, a method of selecting a package model includes: (i) maintaining a data structure of a plurality of package models, wherein each package model has a plurality of package model attributes comprising at least a size and a style; (ii) receiving a user input that is descriptive of a desired package capability; (iii) analyzing, using a semantic reasoner, the user input to determine one or more desired attributes; (iv) automatically selecting one or more package models by accessing the data structure, wherein, for each selected package model, each desired attribute satisfies the corresponding package model attribute; and (v) presenting the one or more selected package models.

In an alternate embodiment, a method of selecting a package model includes: maintaining a data structure of a plurality of package models, wherein each package model has a plurality of package model attributes comprising at least a size and a style; receiving a user input that is descriptive of a desired package capability; analyzing, using a semantic reasoner, the user input to determine one or more desired attributes; determining whether the plurality of package model attributes for each package model satisfies the corresponding desired attributes; creating one or more package models based on the one or more desired attributes; and presenting the one or more created package models.

In an alternate embodiment, a system for selecting a package model, includes a package model database configured to maintain a plurality of package models, wherein each package model has a plurality of package model attributes comprising at least a size and a style. It also includes a semantic reasoner configured to receive a user input that is descriptive of a desired package capability, analyze the user input to determine one or more desired attributes, automatically select one or more package models from the package model database, wherein, for each selected package model, each desired attribute satisfies the corresponding package model attribute, and present the one or more selected package models.

In an alternate embodiment, a system for selecting a package model, includes a package model database configured to maintain a plurality of package models, wherein each package model has a plurality of package model attributes comprising at least a size and a style. It also includes a semantic reasoner configured to receive a user input that is descriptive of a desired package capability, analyze the user input to determine one or more desired attributes, determine whether the plurality of package model attributes for each package model satisfies the corresponding desired attributes, create one or more package models based on the one or more desired attributes, and present the one or more created package models.

In an alternate embodiment, a method of selecting a package model, includes: maintaining a data structure of a plurality of package models, wherein each package model has a plurality of package model attributes comprising at least a size and a style; receiving a user input that is descriptive of a desired package capability; determining one or more terms from the user input, and for each term, selecting an attribute if the term is identical to, a synonym of, a hyponym of, a meronym of, or a holonym of the attribute; automatically selecting one or more package models by accessing the data structure, wherein, for each selected package model, each desired attribute satisfies the corresponding package model attribute; determining whether any package models are not within a processing capability of an assembly device, and if so, removing any package models that are not within the processing capability; and presenting the one or more selected package models to the user.

BRIEF DESCRIPTION OF THE DRAWINGS

Aspects, features, benefits and advantages of the embodiments described herein will be apparent with regard to the following description, appended claims, and accompanying drawings where:

FIG. 4 depicts exemplary predicates used to capture requirements from a user input and describe package attributes according to an embodiment.

FIG. 5 depicts exemplary rules to capture a user input according to an embodiment.

FIG. 6 depicts exemplary package models in a package model knowledge base according to an embodiment.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "package" is a reference to one or more packages and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A "computing device" refers to a system that processes data to perform one or more functions. A computing device may be any processor-based device such as, for example, a server, a personal computer, a personal digital assistant, a web-enabled phone, a smart terminal, a dumb terminal and/or other electronic device capable of processing data and performing functions.

An "assembly device" is a device or machine used in an assembly line that performs a service. For example, an assembly device may be used in a package construction process. In a package construction process, an assembly device may perform package construction services such as, but not limited to, printing, scanning, taxing, folding, sealing, creasing and/or perforating.

A "knowledge base" refers to a repository of searchable data. A knowledge base may include a software component, such as, but not limited to, a database or a table. Alternatively, a knowledge base may include a hardware component, such as, but not limited to, a tangible storage medium. As discussed below, a "package model knowledge base" and a "semantic knowledge base" are specific embodiments of a knowledge base. A package model knowledge base includes one or more package models. A semantic knowledge base includes data in the form of an ontology.

A "semantic reasoner" is a system including one or more computing devices in operable communication with a semantic knowledge base.

A "package model" is a parametric design template for a package.

Figure 1:
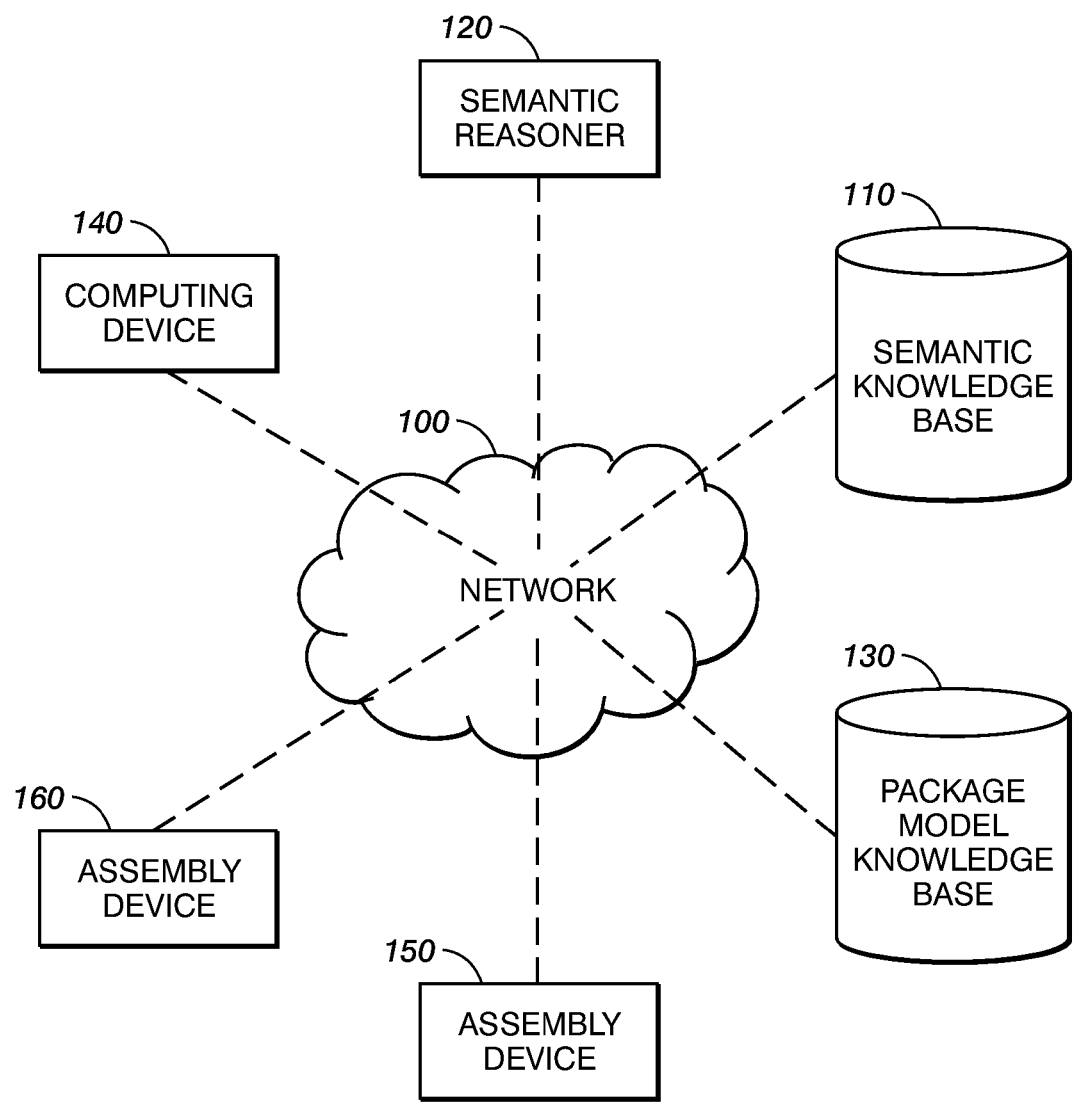
FIG. 1 illustrates a block diagram of an exemplary system for selecting a package according to an embodiment.

FIG. 1 illustrates a system for selecting a package according to an embodiment. As shown in FIG. 1, the system may include a network 100, a semantic knowledge base 110, a semantic reasoner 120, a package model knowledge base 130, a computing device 140, and one or more assembly devices 150, 160. A network 100 may include, but is not limited to, a local area network (LAN), a wide area network (WAN), the Internet, a universal serial bus (USB) network, a Bluetooth network and/or any other communications network The semantic knowledge base 10 may include data in the form of an ontology, such as the web ontology language (OWL), which is released by the World Wide Web Consortium, or another format that allows for the description of classes, attributes, individuals and associated relationships between various structural design constructs. The structural design construct defines individuals of a class and provides attribute/value pairs for individuals and restrictions for certain classes. The class concept may be used to represent a group or set of individual objects with similar characteristics. Package design elements for folding cartons, such as panels, flaps and tabs, are examples of potential classes. Attributes may be used to associate individuals or design elements. For example, an attribute such as "hasPanel" might link an individual "Panel" to an individual "Sleeve." In an embodiment, individuals of a class may provide representations of physical and/or virtual aspects of a structural design.

Semantic relationships may include, but are not limited to, synonyms, antonyms, hyponyms, meronyms and holonyms. Synonyms are two or more words or phrases that are similar or have the same meaning. Antonyms are two or more words or phrases that have an opposite meaning. Hyponyms are two or more words or phrases that describe a specialization or generalization relationship. In an embodiment, hyponyms may be used to define a taxonomical hierarchy of classes. Meronyms are two or more words or phrases that capture the concept of aggregation and/or composition by defining part of a relationship by relating parts to a whole. Holonyms are two or more words or phrases that are parts of, or members of, a whole.

The semantic reasoner 120 may instruct the computing device 140 to provide one or more package models. The semantic reasoner 120 may provide one or more package models by comparing a user input to attributes stored in the semantic knowledge base 110.

The package model knowledge base 130, the semantic knowledge base 110 and the computing device 140 may communicate via a network 100. In an embodiment, the package model knowledge base 130 and the semantic knowledge base 110 may be distributed across a plurality of devices including, but not limited to, the computing device 140 and/or the one or more assembly devices 150, 160.

If the package model knowledge base 130 or a portion thereof is contained within the one or more assembly devices 150, 160 or the computing device 140, the package model knowledge base 130 may directly communicate with the computing device 140 or the assembly devices 150, 160 instead of via the network 100. Similarly, if the semantic knowledge base 110, or a portion thereof, is contained within the one or more assembly devices 150, 160 or the computing device 140, the semantic knowledge base 110 may directly communicate with the computing device 140 or the assembly devices 150, 160 instead of via the network 100.

Figure 2:
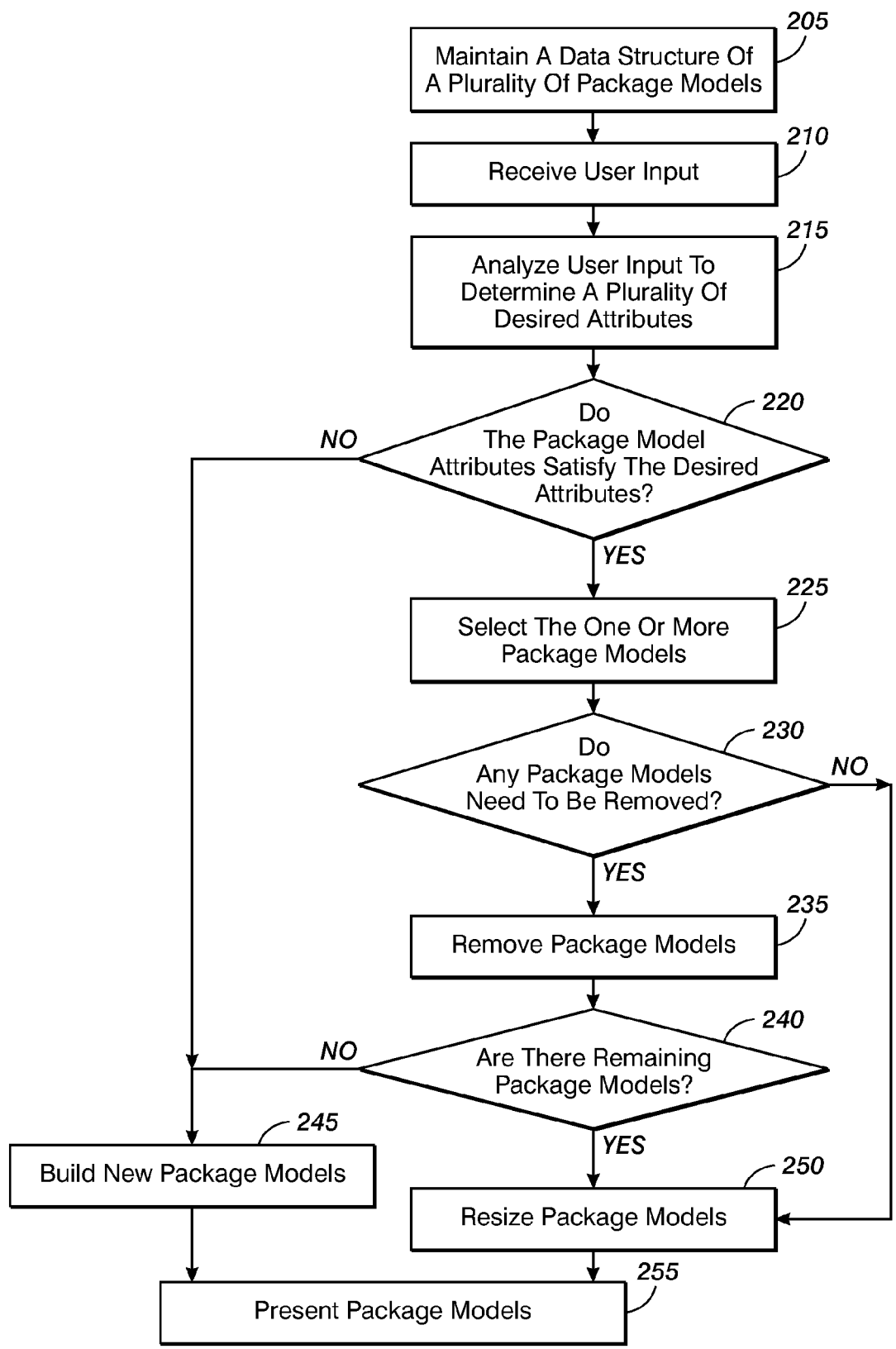
FIG. 2 depicts a flowchart of an exemplary method of selecting a package according to an embodiment.

FIG. 2 depicts a flowchart of an exemplary method of selecting a package according to an embodiment. A data structure of a plurality of package models may be maintained 205. Each package model may have a plurality of package model attributes. The plurality of package model attributes may include at least a size and a style. The package model attributes may also include, but are not limited to, a weight, a fragility, a shape, an attribute of an individual design component, a relationship between package design components, an intended usage, a lifespan, and one or more environmental conditions, such as whether a package is waterproof, whether a package has UV protection and whether a package is recyclable and/or other information about a package model.

A user input may be received 210. In an embodiment, the user input may be descriptive of a desired package capability. For example, a user input may state a need for a rectangular paper carton with internal dimensions of 6" high by 4" wide by 2" deep, the bottom of the carton may need to support 3 pounds when the carton is held upright, the lid of the carton may need to open and close, and the carton may need to provide a tuck with locking flaps.

Using a semantic reasoner, the user input may be analyzed 215 to determine one or more desired attributes. A semantic reasoner may translate the user input into attributes associated with the package models. The semantic reasoner may analyze the user input by comparing the user input to attributes in the semantic knowledge base.

Figure 3:
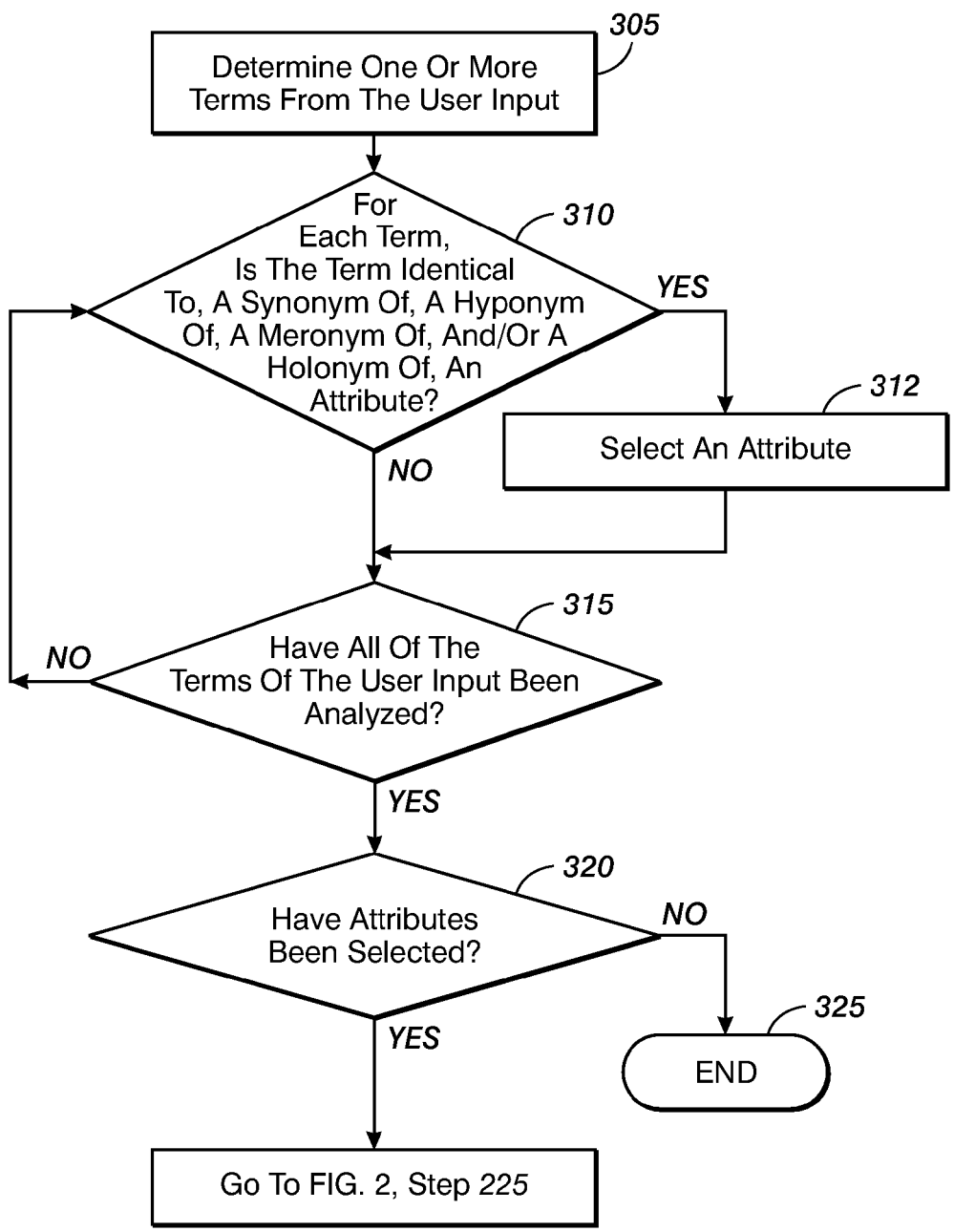
FIG. 3 depicts a flowchart of an exemplary method of analyzing user input according to an embodiment.

FIG. 3 depicts a flowchart of an exemplary method of analyzing user input according to an embodiment. The semantic reasoner may determine 305 one or more terms from the user input. A term may be a word or set of words that is part of the user input.

The semantic reasoner may determine 310 whether a term is identical to, a synonym of, a hyponym of, a meronym of and/or a holonym of an attribute in the semantic knowledge base. If so, the attribute may be selected 312. If at least one term has not been analyzed 315, the process may return to 310. Otherwise, the semantic analyzer may determine if one or more attributes were selected 320. If no attributes were selected 320, the semantic analyzer may terminate 325 its analysis because no attributes match the user input. If one or more attributes were selected 320, then the semantic analyzer may compare the selected attributes with the package model attributes (see FIG. 2).

In addition to determining terms from the user input, analyzing the user input may also include determining the relationships between package design components in order to specify one or more package models. In an embodiment, the attributes may be components of the package. For example, if a user requires a package that can be shipped, the package must have a lid or top component. If the user requires packaging for a fragile item, the package may include bubble wrap and/or may have "FRAGILE" written on the sides of a package.

FIG. 4 depicts exemplary predicates used to capture requirements from a user input and describe package attributes according to an embodiment. In FIG. 4, predicates (i.e., known relationships between variables) may be used to show that package model X has a style Y 401, that the weight is a certain amount 402, and that the aperture 403 and base 404 each have a certain style. Additionally, a predicate may show that package X satisfies the requirements 405.

FIG. 5 depicts exemplary rules to capture a user input according to an embodiment. As depicted in FIG. 5, rule R1 501 states that all designs may be considered acceptable. Rule R2 502 states that the style for the carton may be acceptable. Rule R3 503 states that the aperture may include an interlock flap tuck end, and rule R4 504 states that the base may include an interlock flap tuck end. Rule R5 505 states that the weight may be greater than 3 pounds. Finally, the precedence of each rule may be determined.

Referring back to FIG. 2, the system may determine if the package model attributes for each package model satisfy 220 the desired attributes. If one or more package models with package model attributes satisfy the desired attributes, the one or more package models may be automatically selected 225 by accessing the data structure. For each selected package model, each desired attribute may satisfy the corresponding package model attribute. Based on the attributes, the computing device may identify desired package models from the package model knowledge base.

FIG. 6 depicts exemplary package models in a package model knowledge base according to an embodiment. The package models each may include a unique identifier as well as associated attributes and facets. Based on the user input described above, the package model with the unique identifier of D6 605 may be chosen from the package model knowledge base.

Referring back to FIG. 2, in an embodiment, the system may determine 230 whether any selected package models should be removed. The package models may need to be removed based on one or more restrictions. A restriction is a criteria that a package model must satisfy. In an embodiment, the restriction is based on the system—i.e., capabilities of the assembly devices and/or printing devices—rather than or in addition to attributes of the desired package. Restrictions may include, but are not limited to, processing capabilities of the one or more assembly devices and shipping methods. In an embodiment, a restriction may be included with a user input. In an embodiment, a restriction may be provided after the user input.

If a package model does not meet one or more of the restrictions, then that package model may be removed 235. In an embodiment, if a package model requires assembly that is not within the processing capabilities of an assembly device, then that package model may be removed 235. For example, the selected package models may include a package model that requires edges to be perforated during the assembly process. However, no assembly devices may be capable of perforating the edges. In such a case, the package model with perforated edges may be removed 235.

In an embodiment, the system may remove 235 any package models which do not correspond with predetermined shipping methods. Shipping methods may include, but are not limited to, hand carried, rail, ship, air or palletized. Based on the temperature, pressure or other features of the shipping method, some package models may be removed 235.

After the package models which do not correspond to the one or more restrictions are removed 235, the system may determine 240 if any package models remain. If package models remain, size adjustments 250 may be made to the package models in order to match the user input.

If the package model attributes for each package model do not satisfy the desired attributes or if no desired package models remain 240 after the restrictions have been applied, then the semantic reasoner may use the semantic knowledge base to build 245 one or more package models based on the attributes and the relationships of the components in the semantic knowledge base. The one or more package models may then be stored in the package model knowledge base for future use.

The one or more package models may be presented 255 for user selection. In an embodiment, the package models may be presented using a display. In an embodiment, the package models may be presented via mail, e-mail or facsimile.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of selecting a package model, comprising:
maintaining a data structure of a plurality of package models, wherein each package model has a plurality of package model attributes comprising at least a size and a style;
receiving a user input that is descriptive of a desired package capability;
analyzing, using a semantic reasoner, the user input to determine one or more desired attributes;
automatically selecting one or more package models by accessing the data structure, wherein, for each selected package model, each desired attribute satisfies the corresponding package model attribute; and
presenting the one or more selected package models.

2. The method of claim 1, further comprising:
determining whether any package models are not within a processing capability of an assembly device; and
if so, removing the one or more package models.

3. The method of claim 1, further comprising:
 determining whether any package models do not correspond with predetermined shipping methods; and
 if so, removing the one or more package models.

4. The method of claim 1, further comprising:
 sizing the package models based on the user input.

5. The method of claim 1 wherein the package model attributes further comprise one or more of the following:
 a weight, a fragility, a shape, an attribute of an individual design component, a relationship between package design components, an intended usage, a lifespan, and one or more environmental conditions.

6. The method of claim 1 wherein analyzing the user input to determine one or more desired attributes comprises:
 determining one or more terms from the user input; and
 for each term, selecting an attribute if the term is one or more of identical to, a synonym of, a hyponym of, a meronym of, and a holonym of the attribute in the semantic knowledge base.

7. A method of selecting a package model, comprising:
 maintaining a data structure of a plurality of package models, wherein each package model has a plurality of package model attributes comprising at least a size and a style;
 receiving a user input that is descriptive of a desired package capability;
 analyzing, using a semantic reasoner, the user input to determine one or more desired attributes;
 determining whether the plurality of package model attributes for each package model satisfies the corresponding desired attributes;
 creating one or more package models based on the one or more desired attributes; and
 presenting the one or more created package models.

8. The method of claim 7 wherein the package model attributes comprise one or more of the following:
 a weight, a fragility, a shape, an attribute of an individual design component, a relationship between package design components, an intended usage, a lifespan, and one or more environmental conditions.

9. The method of claim 7 wherein analyzing the user input to determine one or more desired attributes comprises:
 determining one or more terms from the user input; and
 for each term, selecting an attribute if the term is one or more of identical to, a synonym of, a hyponym of, a meronym of, and a holonym of the attribute in the semantic knowledge base.

10. A system for selecting a package model, comprising:
 a package model database configured to maintain a plurality of package models, wherein each package model has a plurality of package model attributes comprising at least a size and a style; and
 a semantic reasoner configured to:
  receive a user input that is descriptive of a desired package capability,
  analyze the user input to determine one or more desired attributes,
  automatically select one or more package models from the package model database, wherein, for each selected package model, each desired attribute satisfies the corresponding package model attribute, and
  present the one or more selected package models.

11. The system of claim 10 wherein the semantic reasoner is further configured to:
 determine whether any package models are not within a processing capability of an assembly device; and
 if so, remove the one or more package models.

12. The system of claim 10 wherein the semantic reasoner is further configured to:
 determine whether any package models do not correspond with predetermined shipping methods; and
 if so, remove the one or more package models.

13. The system of claim 10 wherein the semantic reasoner is further configured to:
 size the package models based on the user input.

14. The system of claim 10 wherein the semantic reasoner is further configured to:
 determine one or more terms from the user input; and
 for each term, select an attribute if the term is one or more of identical to, a synonym of, a hyponym of, a meronym of, and a holonym of the attribute in the semantic knowledge base.

15. A system for selecting a package model, comprising:
 a package model database configured to maintain a plurality of package models, wherein each package model has a plurality of package model attributes comprising at least a size and a style; and
 a semantic reasoner configured to:
  receive a user input that is descriptive of a desired package capability,
  analyze the user input to determine one or more desired attributes,
  determine whether the plurality of package model attributes for each package model satisfies the corresponding desired attributes,
  create one or more package models based on the one or more desired attributes, and
  present the one or more created package models.

16. The system of claim 15 wherein the semantic reasoner is further configured to:
 determine whether any package models are not within a processing capability of an assembly device; and
 if so, remove the one or more package models.

17. The system of claim 15 wherein the semantic reasoner is further configured to:
 determine whether any package models do not correspond with predetermined shipping methods; and
 if so, remove the one or more package models.

18. The system of claim 15 wherein the semantic reasoner is further configured to:
 determine one or more terms from the user input; and
 for each term, select an attribute if the term is one or more of identical to, a synonym of, a hyponym of, a meronym of, and a holonym of the attribute in the semantic knowledge base.

19. A method of selecting a package model, comprising:
 maintaining a data structure of a plurality of package models, wherein each package model has a plurality of package model attributes comprising at least a size and a style;
 receiving a user input that is descriptive of a desired package capability;
 determining one or more terms from the user input, and for each term, selecting an attribute if the term is identical to, a synonym of, a hyponym of, a meronym of, or a holonym of the attribute;
 automatically selecting one or more package models by accessing the data structure, wherein, for each selected package model, each desired attribute satisfies the corresponding package model attribute;
 determining whether any package models are not within a processing capability of an assembly device, and if so, removing any package models that are not within the processing capability; and
 presenting the one or more selected package models to the user.

* * * * *